Nov. 5, 1957 V. R. TRABUCCO 2,812,147
HELICOPTER PARACHUTE ATTACHING STRUCTURE
Filed Oct. 15, 1954 3 Sheets-Sheet 1

Inventor
Vincent R. Trabucco

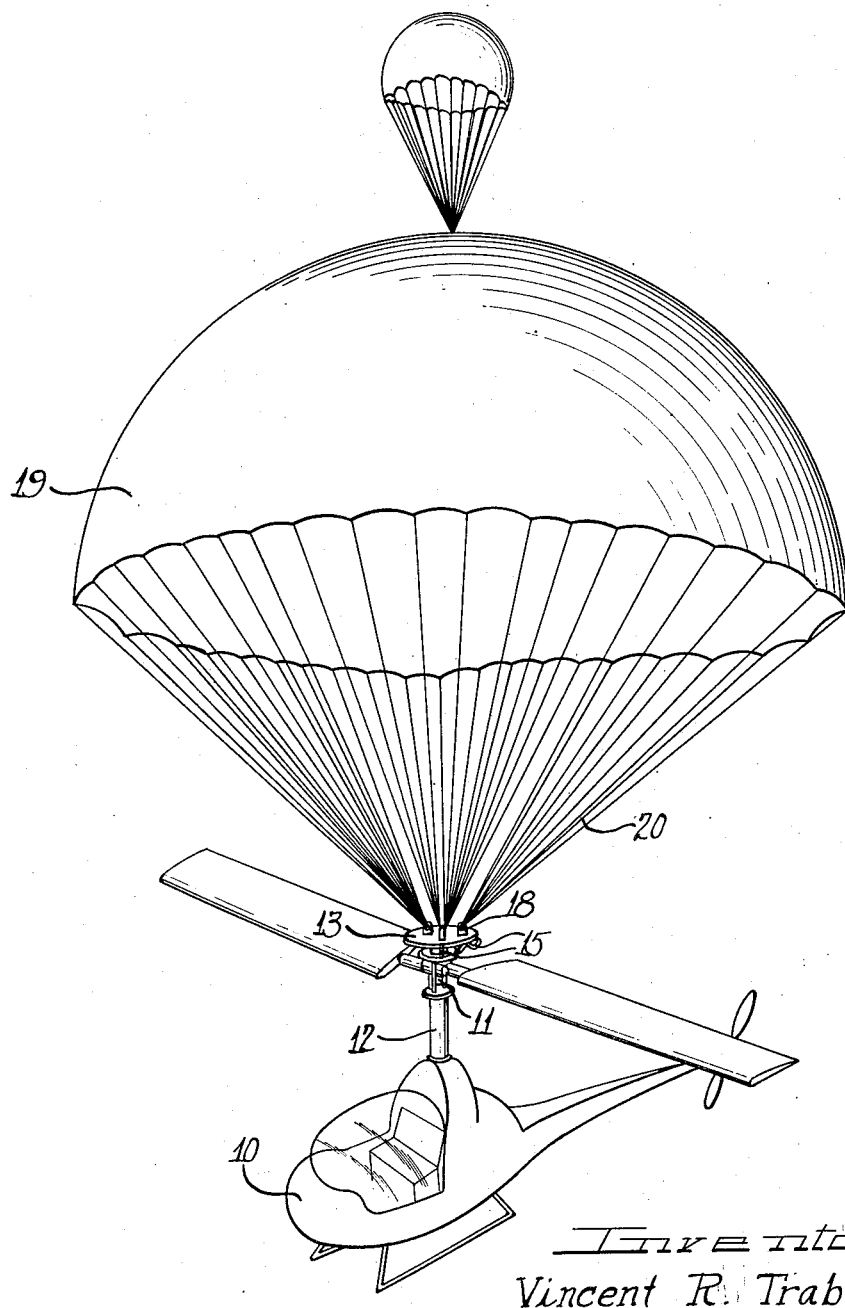

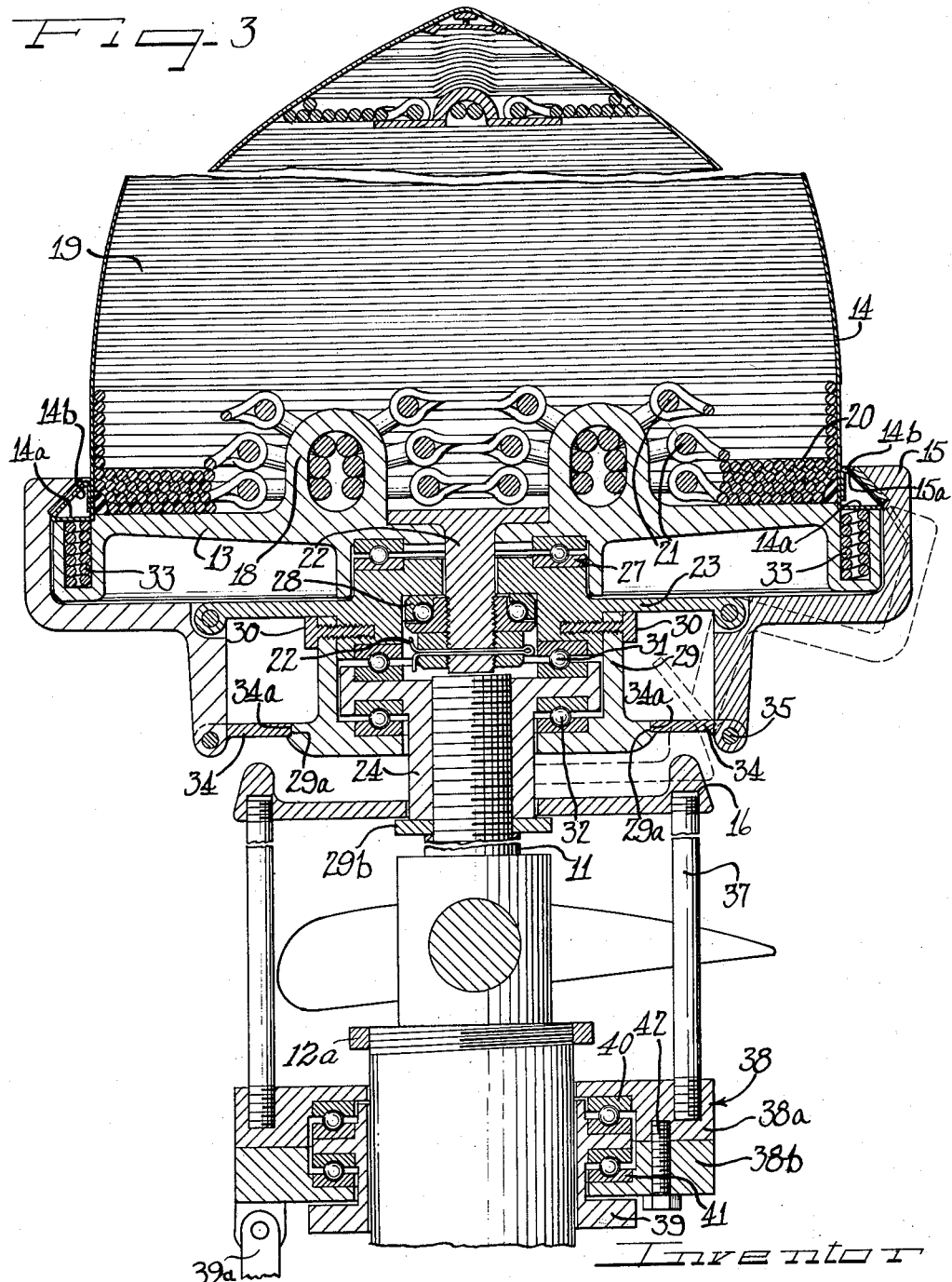

2,812,147

HELICOPTER PARACHUTE ATTACHING STRUCTURE

Vincent R. Trabucco, Steger, Ill.

Application October 15, 1954, Serial No. 462,561

2 Claims. (Cl. 244—139)

The present invention relates to safety devices and is more particularly concerned with the construction of a parachute and parachute mounting apparatus for use with helicopters or the like.

As those skilled in the art are aware, helicopters derive their sole sustaining force from their rotors and accordingly such aircraft have substantially no glide characteristic upon the disablement of the motor driving the main helicopter rotor. While it has been found that the main propeller will, when permitted to rotate freely without power application, substantially slow the descent of a helicopter after engine disablement it has been found desirable to further reduce the speed of descent in such a case of disablement. Further, it is readily apparent that if the disablement is one in which the helicopter blades themselves become broken or inoperative the usual sustaining action will be either completely eliminated or substantially reduced.

The present invention contemplates the provision of a safety parachute which may be manually released subsequent to disablement of the helicopter to an extent which causes the helicopter to fall at an unsafe rate of speed. According to the principles of the present invention, a parachute is carried in position atop the helicopter main rotor shaft in a streamlined housing having substantially no effect on the aerodynamic operation of the helicopter during normal flight conditions and which may readily be released upon disablement of the aircraft to permit ejection of a large diameter parachute capable of slowing the fall of the helicopter to a safe level.

Accordingly, it is an object of the present invention to provide a safety parachute for helicopters or the like.

Yet another object of the present invention is to provide a safety parachute construction for aircraft or the like having a vertical power shaft extending thereabove.

Yet a further object of the present invention is to provide a novel parachute storage chamber for helicopters whereby conventional operation of the helicopter is unimpaired and yet whereby the parachute is positioned in condition for immediate use irrespective of the condition of the helicopter main rotor blading.

Another object of the present invention is to provide a parachute safety system for helicopters or the like wherein the parachute is mounted independently of the rotor shaft whereby rotation of the helicopter blading will not be transmitted to the parachute shroud lines.

A feature of the invention is the provision of a support platform rotatably mounted relative to the helicopter rotor drive shaft for the attachment of a parachute.

Yet another feature of the invention resides in the provision of a parachute enclosure dome offering a minimum aerodynamic resistance to helicopter flight and which is secured to a rotatable parachute attaching platform secured to the upper end of the rotor shaft.

Still a further object of the present invention is to provide a parachute for helicopters which is actuatable manually with a minimum of effort on the part of the operator and without the need of power implements of any sort whereby complete power failure of the helicopter will in nowise prevent operation of the parachute.

Still a further feature of the invention is the provision of a novel trigger release mechanism for parachutes.

Still other and further objects and features of the present invention will at once become apparent to those skilled in the art from a consideration of the attached drawings wherein a preferred form of the invention is shown by way of illustration only; and wherein:

Figure 2 is a partial isometric view illustrating a parachute constructed according to the present invention in operation; and Figure 3 is a cross-sectional view of the parachute storage and releasing apparatus constructed in accordance with the present invention.

As shown on the drawings:

Figure 1:
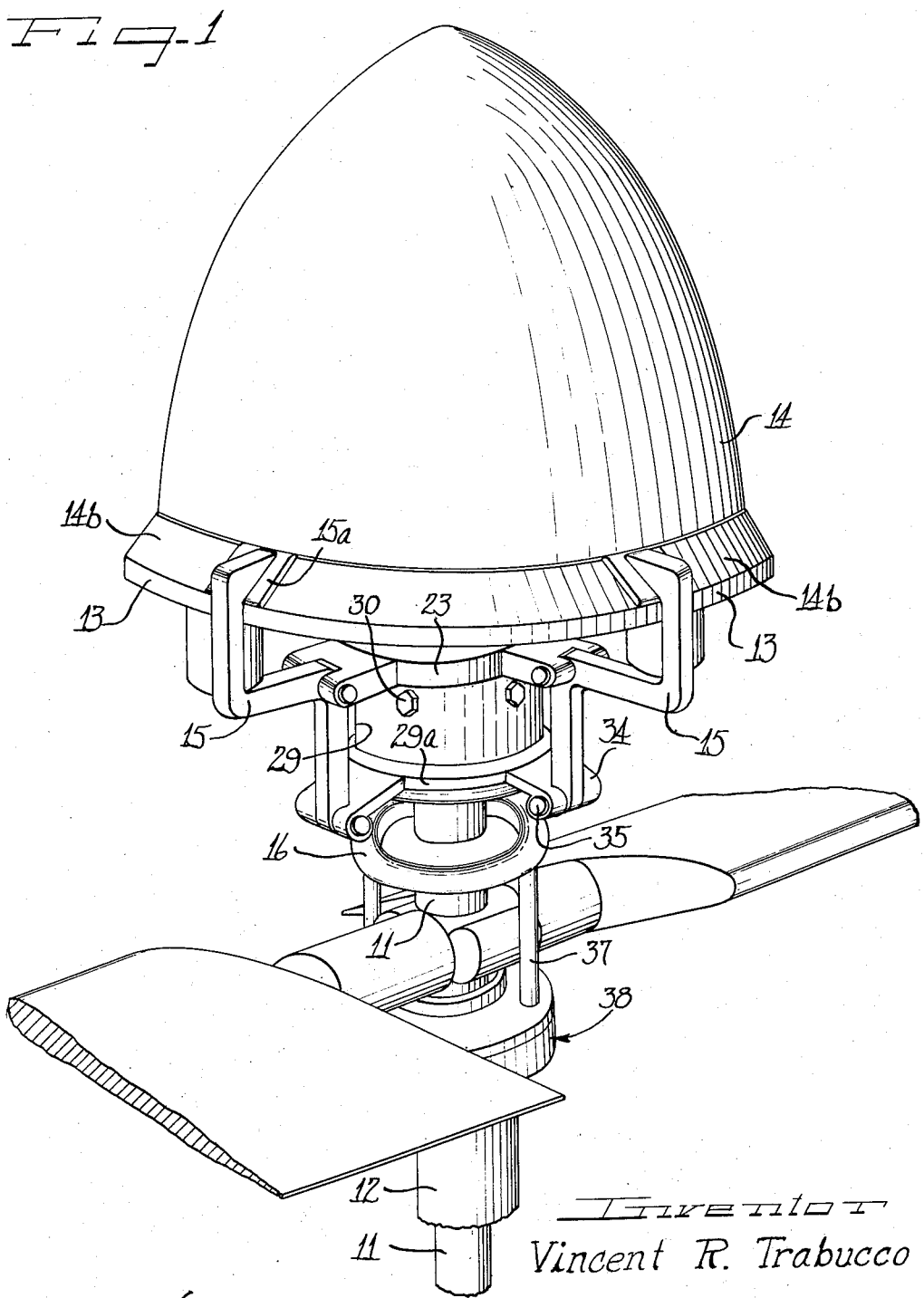
Figure 1 is an isometric view of a helicopter rotor and parachute attachment platform constructed according to the present invention.

As may be seen from a consideration of Figures 1 and 2, a helicopter fuselage 10, of any conventional form, is provided with a vertically disposed rotor drive shaft 11 carried within a vertically disposed non-rotatable drive shaft housing 12. A parachute attachment platform 13 is rotatably mounted relative to the drive shaft 11 at the upper end thereof and is provided with a dome-shaped releasable cover 14 maintained thereon by means of latch members 15. The cover 14 is released by pivotal movement of the latches 15 away from the peripheral edge 14a of the cover upon actuation of the latches by a releasing hammer 16 in turn slidably mounted on the shaft housing 12 and for rotation relative thereto.

The internal construction of the device may be understood from a consideration of Figure 3. As there shown, the attachment platform or table 13 is provided with a plurality of integral parachute-retaining loops 18, which loops preferably number at least four. The parachute itself is folded, as shown at 19, within the domed cover 14 and is secured by its lines 20 and line rings 21 to the loops 18.

The table 13 is swivelly mounted relative to the drive shaft 11 by means of a swivel bolt 22 carried by a latch hub or sleeve 23 which is in turn pivotally carried by the drive shaft thrust bearing housing 24. The thrust bearing housing 24 is threadedly secured to the end of the drive shaft 11 by threads 25 and is locked for rotation with the drive shaft by any conventional means, such as, for example, a transverse key passing through aligned apertures in the housing 24 and shaft 11.

Free rotational pivoting action is provided between the table 13 and the shaft 11 by means of a plurality of thrust bearings. These include thrust bearings 27 and 28 which provide antifriction rotational freedom between the pivot bolt 22 and the latch carrying hub or sleeve 23. The hub or sleeve 23 is, in turn, fixedly secured to the sear drum 29 by means of screws 30. The hub or sleeve 23 and drum 29 are combined to provide bearing supports for the two thrust bearings 31 and 32 which provide antifriction rotational freedom between the members 23, 29 and the thrust bearing housing 24. Since the thrust bearing housing 24 is rigidly secured to the shaft 11, it is then clear that the table or plate 13 is antifrictionally connected to the shaft 11 through two separate pairs of antifriction thrust bearings mounted in series, thus giving complete freedom of rotation to the table 13, while at the same time providing secure attachment to the end of the shaft 11.

As was noted above, the table 13 carries a cover 14 for enclosing the parachute. The cover 14 comprises a generally dome-shaped element having a spun over projecting edge 14a and a reversely turned angularly extending latch surface 14b. As may be seen from Figure 3, the surface 14a seats against the table 13 and a plurality of compression springs 33 so that upon disengagement of the cover by the respective latches 15, the cover will be thrown by the springs 33 away from the table 13 to permit the parachute to open. The latch members 15 are provided with angularly disposed surfaces 15a which cooperate with the angularly disposed peripheral edge 14b of the cover 14 and when positioned in the solid lines shown in Figure 3, the latches positively maintain the cover in fixed position on the plate 13.

The latch members 15 are controlled by the trip finger elements 34 pivotally mounted at 35 to the lower end of each of the latches 15 and, as shown in the solid lines of Figure 3, in the latched condition the ends 34a of the latches engage the sear portion 29a of the drum 29. Movement of the latches 15 is therefore permitted only upon pivotal movement of the fingers 34 away from the surface 29a. As illustrated, each pivotal movement is accomplished by means of a hammer ring 16 freely carried by the thrust bearing housing 24 and upwardly actuatable by the rods 37 secured to a manually actuated collar 38.

Since the members 36, 37 and 38 must rotate with the helicopter rotor, a rotatable connection is provided between the collar 38 and the reciprocating manual actuator 39. This connection is shown in Figure 3 wherein the thrust bearings 40 and 41 are provided between the separate halves 38a and 38b of the collar 38. During assembly, the halves 38a and 38b are, of course, bolted together by means of any conventional fastener such as, for example cap screws 42. This antifriction connection provided by the bearings 40 and 41 permits the actuator 39 to be reciprocated relative to the housing 12 without rotation relative thereto while at the same time permitting rotation of the hammer 16 with the drive shaft 11 and the helicopter rotor, thereby permitting actuation of the latches 15 without interference with the rotor blades.

In operation, the helicopter parachute apparatus above set forth is assembled with the parachute packed as at 19 on the table 13. The cover 14 is then forced downwardly against the action of the springs 33 until in the position shown in solid lines in Figure 3. At that time the latches 15 are rotated about their respective pivots until the angular portions 15a are in contact with the portions 14a of the cover 14, at which time the trip fingers 34 are pivoted downwardly into abutting engagement with the sear surface 29a of the drum 29. With the parts in the above recited position, the cover 14 is positively maintained against release, and the helicopter may be operated in the conventional manner.

If, during flight, a rotor blade should become broken or the helicopter otherwise rendered inoperative the operator merely reciprocates the actuating member 39 by means of any conventional linkage system 39a having an operating lever or solenoid within the helicopter control compartment. Reciprocation of the member 39 causes the hammer ring 16 to disengage the trigger members 34 from the sears 29a and permits the latches 15 and trigger members 34 to move into the dotted line position shown in Figure 3 as a result of force exerted on the upper ends of the latches 15 by the springs 33. During this disengaging movement of the latches 15, the cover 14 is forced sharply upwardly by the springs 33 permitting the parachute to open.

During the fall of the helicopter and after the parachute has opened, the parachute operation is completely unaffected by pivotal movement of the helicopter rotor blades or rotation of the helicopter fuselage itself in view of the antifriction rotational connection between the plate 13 to which the parachute is attached and the helicopter rotor shaft 11, as well as the helicopter rotor shaft housing 12.

While the springs 33 have been found satisfactory for purposes of both disengaging the latches 15 and ejecting the cover 14, it is considered within the scope of the present invention to provide separate latch actuating springs for urging the latch members 15 in the latch-disengaged positions. Such additional springs could, for example, comprise wire wound type springs at the pivot of the latches 15 providing a torque at that point tending to pivot the latches 15 away from the surface 14b of the cover 14.

Likewise, a spring may be provided between each of the trips 34 and its respective latch 15 for prevention of inadvertent latch disengagement as a result of engine and/or wind-induced vibration.

The present safety apparatus is effective under all circumstances of motor or rotor failure. Even if the rotor shaft 10 should break, the parachute will remain secured to the helicopter by the stop collars 29b and 12a which are secured to the housing 24 and 12 respectively.

It will thus be apparent that I have provided a novel and extremely useful safety apparatus for helicopters or the like having rotatable superstructure. It will be understood, also, that variations and modifications may be made in the structure herein shown and described without departing from the scope of the novel concepts herein set forth. It is, therefore, my intention that the scope of the present invention be limited solely by the appended claims.

I claim as my invention:

1. A safety mechanism for helicopters having a rotor driven by a vertical shaft, comprising a platform rotatably connected to said shaft at a point above said rotor, means on said platform for connecting a parachute thereto, a cover for said platform for confining said parachute, biasing springs positioned between said cover and said platform for urging them apart, latch means securing said cover to said platform against the urging of said biasing springs, latch release ring means for releasing said cover, said latch release means being rotatable with said shaft and rotatable relative to said platform, and actuating means rotatably mounted relative to said latch release means at a point below said rotor whereby said latch release means may be actuated independently of the rotation of said rotor and said shaft.

2. A parachute attaching structure for securing a parachute to a vertical shaft for operation independently of the rotation thereof which comprises a platform, a thrust bearing housing secured to the end of said shaft, a sleeve rotatably mounted relative to said housing and separated therefrom by a pair of opposed axially facing thrust bearings, thrust bearing means positioned axially between the top end face of said sleeve and the bottom face of said platform, fastening means passing through said platform and said sleeve and having a thrust bearing between the opposite end thereof and the sleeve whereby said platform is antifrictionally secured to said sleeve, latch means mounted on said sleeve for maintaining a cover on said platform, sear means on said sleeve controlling said latch, and latch actuating means axially movable relative to said sleeve and rotatable relative thereto whereby said platform and said latch mechanism are mounted for free rotation relative to said shaft.

References Cited in the file of this patent

UNITED STATES PATENTS

| 1,023,233 | Williams | Apr. 16, 1912 |
| 1,039,295 | Kratofill | Sept. 24, 1912 |
| 1,541,534 | Souder | June 9, 1925 |
| 1,705,489 | Mladinich | Mar. 19, 1929 |
| 2,549,407 | Apostolescu | Apr. 17, 1951 |

FOREIGN PATENTS

| 870,952 | Germany | Mar. 19, 1953 |